United States Patent
Völker et al.

[15] 3,697,583
[45] Oct. 10, 1972

[54] PROCESS FOR PRODUCING ACRYLIC ACID ESTERS

[72] Inventors: Theodor Völker; Klaus Hering, both of Fribourg, Switzerland

[73] Assignee: Lonza Ltd., Gampel/Valais, Basel, Switzerland

[22] Filed: March 30, 1970

[21] Appl. No.: 29,334

[30] Foreign Application Priority Data

March 31, 1969 Switzerland...............4825/69

[52] U.S. Cl. .............................................260/486 R
[51] Int. Cl. ............................................C07c 69/54
[58] Field of Search .......................260/486 R, 486 D

[56] References Cited

FOREIGN PATENTS OR APPLICATIONS 772,647  11/1967  Canada......................260/482

Primary Examiner—Lorraine A. Weinberger
Assistant Examiner—Paul J. Killos
Attorney—Christen & Sabol

[57] ABSTRACT

A process for producing acrylic acid esters by reacting maleic acid anhydride with an alcohol component consisting of at least one aliphatic alcohol having one to four carbon atoms to give the corresponding maleic acid half ester, and decarboxylating the half ester in the presence of a copper compound, especially cupric oxide, and of a compound containing a tertiary nitrogen atom in a ring of the pyridine type, is carried out in advantageous manner when the molar ratio (X) of the alcohol component to maleic acid anhydride is governed by the equation $$x = 98/m - M$$

wherein $m$ is a number from 92 to 106, and $M$ is the molecular weight of the alcohol forming the alcohol component, or if the alcohol component consists of at least two alcohols, M is the arithmetic mean of the molecular weights of the alcohols, corresponding to the molar ratio of the alcohols.

7 Claims, No Drawings

PROCESS FOR PRODUCING ACRYLIC ACID ESTERS

BACKGROUND OF THE INVENTION

1. Field of the Invention

This invention relates to a process for the production of acrylic acid esters from maleic acid anhydride by converting the maleic acid anhydride with an excess of an alcohol into an alcoholic solution of the corresponding maleic acid half ester and decarboxylating the maleic acid half ester in its alcoholic solution in the presence of compounds with a tertiary nitrogen atom in a ring of the pyridine type and in the presence of a copper compound such as copper oxide as catalyst.

2. Prior Art

There are numerous process for the production of acrylic esters by decarboxylating the corresponding maleic acid half esters. Thus for example, decarboxylation can be carried out in the presence of zinc oxide, triphenyl phosphine or metallic copper.

It is also known that mono copper salts of maleic acid half esters can be decarboxylated at elevated temperatures into the corresponding acrylic acid esters in the presence of compounds with a tertiary nitrogen atom in a ring of the pyridine type as reaction medium.

Since the usual decarboxylation temperatures in these processes are above 200°C, maleic acid half esters dissociate into maleic acid anhydride and alcohol in a yield-reducing side reaction. Since, in addition, maleic acid anhydride forms resinous impurities under the reaction conditions, the reaction bath becomes contaminated. In addition, the catalyst (copper oxide for example) is consumed at a high rate as a result of reduction.

In order to prevent the half esters from dissociating into anhydride and alcohol, excess alcohol is added in quantities of from 4 to 5 mols, based on the half ester, because the dissociation reaction is an equilibrium reaction. Unfortunately, an excess of alcohol reduces the yield per reaction volume and per unit of time, in addition to which energy is unnecessarily consumed in evaporating the alcohol, and extra work is involved in working up the unnecessarily highly diluted acrylic ester solutions. Finally, the copper oxide used as catalyst is reduced at a high rate into metallic copper by excess alcohol, greatly reducing the catalyst yield.

It is also known that the alcohol excess can be reduced by carrying out decarboxylation in the presence of acrylic acid esters, preferably those of the kind formed during the reaction. The disadvantage of this process is that some of the end product formed has to be returned to the starting mixture, thus increasing the volume of the reaction mixture and reducing the volume-time yield. Since the acrylic acid esters returned are exposed to further thermal stressing, the yield is also reduced through polymerization of the acrylic acid esters.

DESCRIPTION OF THE INVENTION

The object of the present invention is to provide a process for the production of acrylic esters from maleic acid anhydride in which a. an optimally high yield of acrylic ester, based on maleic acid anhydride, b. optimum volume-time yields of acrylic ester, and c. an optimum yield of acrylic ester, based on the catalyst, can be obtained in the decarboxylation of maleic acid half esters.

According to the invention, this object is achieved by a process for the production of acrylic acid esters wherein a mixture of an alcohol component which consists of at least one monohydric primary and/or secondary aliphatic alcohol with one to four carbon atoms, and maleic acid anhydride, is heated to convert the maleic acid anhydride into the maleic acid half ester corresponding to the alcohol component and the maleic acid half ester thus obtained is subsequently decarboxylated by further heating of the reaction mixture in the presence of a copper compound and of a compound containing a tertiary nitrogen atom in a ring of the pyridine type in which process the molar ratio ($x$) of the alcohol component to maleic acid anhydride is defined by the equation, $$x = 98/m - M$$

in which $m$ is a number from 92 to 106 and $M$ is the molecular weight of the alcohol forming the alcohol component or, when the alcohol component is in a mixture of at least two alcohols, $M$ is the arithmetic mean of the molecular weights of the alcohols, corresponding to the molar ratio of the alcohols.

Monohydric primary and/or secondary aliphatic alcohols containing from one to four carbon atoms are used. It is of course also possible to use mixtures of these alcohols, optionally with alcohols containing more than four carbon atoms. The molecular weights of the alcohols or, in the case of mixtures of alcohols, the arithmetic mean of the molecular weights of the alcohols, corresponding to the molar ratios of the alcohols in the mixture, must be within the range determined by the aforementioned formula. If methanol (molecular weight = 32) for example is used, $M = 32$. If a mixture of methanol and butanol (molecular weight = 74) in a molar ratio of 1:1 is used, $M = \frac{1}{2}(32 + 74) = 53$.

The choice of the alcohols is of course governed by the acrylic ester which it is desired to obtain through decarboxylation of the monomaleate.

The molar ratio of alcohol to maleic acid anhydride changes according to the type of alcohol used. It has been found that this ratio is determined by the molecular weight of the alcohol, and the optimum yield of acrylate is obtained when the procedure according to the invention is followed. Alcohol excesses greater than those allowed by the upper limit of the equation produce little or no increase in the yield, while quantities exceeding the upper limit of the alcohol component greatly reduce the volume-time yields. The service life of the catalysts is also reduced.

The maleic acid half esters are decarboxylated by way of the corresponding mono-copper salts, prepared in situ in the presence of cuprous or cupric compounds, (e.g. cuprous oxide, cupric oxide or basic copper carbonate). In known processes, decarboxylation is carried out in reaction baths consisting of compounds with a tertiary nitrogen atom in a ring of the pyridine type (e.g. pyridine, quinoline or acridine). The reaction temperatures are in the range from 100° to 290°C. Compounds with a tertiary nitrogen atom in ring of the pyridine type enable the decarboxylation velocity to be considerably increased.

The volume-time yield is the yield of acrylic ester in mols per reaction volume and unit of time. This is also based on the subsequent working up of the acrylate solution formed during decarboxylation from which the acrylate is recovered.

EXAMPLES

Preparation of the Alcoholic Solution of Monomaleic Acid Esters

Maleic acid half ester solution were prepared by dissolving the calculated quantity of maleic acid anhydride in the calculated quantity of alcohol by heating at 50° to 75°C in accordance with the procedure described above. In the case of primary alcohols, the reaction lasts for 10 minutes and in the case of secondary alcohols for 45 minutes.

Decarboxylation

The tests were carried out in a 1,000 ml. capacity four-necked flask equipped with stirring mechanism (speed of stirrer 250 r.p.m.) surmounted by an 18 cm. column (30mm diameter) filled with Raschig rings (8 × 8 mm). In each instance, the alcoholic solution of the maleic acid half ester was introduced by means of a dropping funnel projecting into the reaction bath and extending to the bottom of the flask. In each instance, the reaction bath consisted of 360 g of quinoline ($n_{20}$1.624 to 1.626), 46 g (0.58 mol) of cupric oxide and 0.24 g of pyrocatechol and had a temperature of from 210° to 214°C.

In order to keep the temperature prevailing in the reaction bath constant at 210°-214°C in all the tests, the reaction solutions were run into the reaction bath at a rate of 250 ml/hour under a slight nitrogen excess pressure. The maleic acid half ester was introduced in a four-fold excess, based on the cupric oxide used. In other words, 2.3 mols of the variously concentrated alcoholic solutions of maleic acid half ester were introduced into the reaction bath. Before and after each solution was passed through the column, 20 ml. of the corresponding alcohol or alcohol mixture were passed through the heated reaction bath in each instance, in order to heat the column and to prevent losses through adhesion to the column.

The acrylate yield was determined on the one hand by gas chromatography, and on the other hand by determining the saponification numbers of the combined and carefully intermixed starting liquids.

In order to determine the effective life of the cupric oxide catalyst, the reaction bath was filtered on completion of the test, the filter residue washed with 200 ml. of methanol and then with 200 ml. of isopropanol, carefully dried and weighed. The product was then heated while stirring at red heat until constant in weight and until cupric oxide had been formed. The effective life of cupric oxide, expressed in mols of maleic acid half ester per mol of cupric oxide, was calculated from the increase in weight accompanying oxidation of the consumed catalyst components.

The possible yield of mol of acrylate per mol of cupric oxide is calculated on the basis of the fact, determined in independent tests, that the decarboxylation reaction proceeds in the absence of any additional reductions in yield up to a 50 percent consumption of cupric oxide. Accordingly, it is calculated from the following data: yield of acrylate, based on maleic acid half ester, as a percentage of the theoretical, and half the effective life of cupric oxide expressed in mols of maleic acid half ester per mol of cupric oxide. The yield of mol of acrylate per mol of cupric oxide calculated indicates the yield of acrylate in mols, after which the catalyst should be replaced by fresh cupric oxide or regenerated. Accordingly, it is an important factor so far as the commercial application of the process is concerned.

The results obtained are set out in the following Tables:

TABLE 1

| Example | Alcohol used | Molar ratio of alcohol to maleic anhydride | m according to formula | Yield of acrylate in percent of theoretical | Volum-time yield of acrylate based on 1,000 ml. of reaction vol. per hour | Effective life of CuO-catalyst mols of maleic acid half ester per mol of CuO | Effective acrylate yield in mols/mol of CuO |
|---|---|---|---|---|---|---|---|
| 1 | Methanol | 1:1 | *130 | 40.5 | 83.5 | | |
| 2 | do | 1.2:1 | *114 | 65.1 | 125.1 | | |
| 3 | do | 1.33:1 | 106 | 79.2 | 144.0 | | |
| 4 | do | 1.385:1 | 103 | 80.5 | 144.0 | | |
| 5 | do | 1.44:1 | 100 | 83.5 | 147.0 | | |
| 6 | do | 1.505:1 | 97 | 82.3 | 140.0 | | |
| 7 | do | 1.63:1 | 92 | 82.6 | 135.0 | | |
| 8 | do | 4.00:1 | *56.5 | 84.1 | 79.5 | | |
| 9 | Ethanol | 1:1 | *144 | 65.2 | 129 | 9.2 | 2.80 |
| 10 | do | 1.2:1 | *127.5 | 71.5 | 131 | 14.4 | 5.15 |
| 11 | do | 1.45:1 | *113.6 | 81.0 | 133 | 17.3 | 7.00 |
| 12 | do | 1.645:1 | 105.5 | 86.2 | 135 | 23.8 | 10.25 |
| 13 | do | 1.815:1 | 100 | 91.4 | 133 | 25.6 | 11.70 |
| 14 | do | 2.0:1 | 95.0 | 90.6 | 123 | 25.2 | 11.41 |
| 15 | do | 2.5:1 | *85.0 | 91.1 | 107.5 | 21.9 | 9.95 |
| 16 | Mixture of isobutanol and methanol molar ratio 1:1 | 1:1 | *151 | 53.4 | 108.5 | 8.2 | 2.19 |
| 17 | | 2.1:1 | 99.7 | 92.1 | 121.0 | 24.2 | 11.15 |
| 18 | | 4.0:1 | *77.5 | 88.0 | 70.5 | 19.8 | 8.70 |

*Molar ratio of alcohol to maleic acid anhydride differing from the invention.

TABLE 2

| Example | Alcohol used | Molar ratio of alcohol to maleic anhydride | m according to formula | Yield of acrylate in percent of theoretical | Effective life of CuO-catalyst moles of maleic acid half ester per mol of CuO | Effective acrylate yield in mols/mol CuO |
|---|---|---|---|---|---|---|
| 19 | Isopropanol | 1:1 | *158 | 49.5 | 8.2 | 2.03 |
| 20 | do | 1.6:1 | *121 | 80.4 | 16.3 | 5.70 |
| 21 | do | 2.13:1 | 106 | 87.9 | 19.2 | 8.35 |
| 22 | do | 2.25:1 | 103.5 | 93.3 | 21.7 | 10.3 |
| 23 | do | 2.45:1 | 100 | 95.0 | 24.5 | 11.6 |
| 24 | do | 2.80:1 | 94.5 | 93.3 | 25.1 | 11.7 |
| 25 | do | 3.3:1 | *89.5 | 93.4 | 20.5 | 9.55 |
| 26 | n-Butanol | 1:1 | *172 | 66.1 | 9.6 | 3.18 |
| 27 | do | 3.5:1 | 102 | 92.5 | 26.6 | 12.30 |
| 28 | do | 5.0:1 | 93.6 | 92.3 | 24 | 11.15 |
| 29 | do | 7.0:1 | *88.0 | 92.4 | 21.4 | 9.90 |

*Molar ratio of alcohol to maleic acid anhydride differing from the invention.

We claim:

1. A process for producing acrylic acid esters which consists of (a) forming a maleic acid half ester from a mixture consisting of maleic acid anhydride and at least one alcohol component selected from the group of aliphatic, monohydric primary alcohols, aliphatic monohydric secondary alcohols and mixtures thereof the molar ratio ($x$) of said alcohol to said maleic acid anhydride component being defined by the equation $$x = {}^{98}/m - M$$

wherein $m$ is a number from 92 to 106, $M$ is the molecular weight of the alcohol forming the alcohol component when said alcohol component consists of a single alcohol, and M is the arithmetical mean of the molecular weights of the alcohols forming the alcohol component when said alcohol component consists of a plurality of alcohols, (b) decarboxylating said maleic acid half ester to an acrylic acid ester by heating said maleic acid ester at a temperature within the range from about 100°C. to about 290°C. in the presence of a mixture consisting of a copper compound in a solvent having a tertiary nitrogen atom in a ring of the pyridine type, and (c) isolating said acrylic acid ester.

2. A process according to claim 1 wherein said copper compound is selected from the group consisting of cuprous oxide, cupric oxide and basic copper carbonate.

3. A process according to claim 1 wherein said solvent is selected from the group consisting of pyridine, quinoline and acridine.

4. A process according to claim 1 wherein said maleic acid half ester is decarboxalated at a temperature from 100° to 290°C.

5. A process for producing acrylic acid esters which consists of (a) forming a maleic acid half ester from a mixture consisting of maleic acid anhydride and at least one alcohol component selected from the group consisting of aliphatic, monohydric primary alcohols and mixtures thereof, the molar ratio ($x$) of said alcohol to said maleic acid anhydride component being defined by the equation $$x = {}^{98}/m - M$$

wherein $m$ is a number from 92 to 106, $M$ is the molecular weight of the alcohol forming the alcohol component when said alcohol component consists of a single alcohol, and $M$ is the arithmetical mean of the molecular weights of the alcohols forming the alcohol component when said alcohol component consists of a plurality of alcohols, (b) decarboxylating said maleic acid half ester to an acrylic acid ester by heating said maleic half ester at a temperature within the range from about 100°C. to about 290°C. in the presence of a mixture consisting of a copper compound, a polymerization inhibitor in a solvent having a tertiary nitrogen atom in a ring of the pyridine type, and (c) isolating said acrylic acid ester.

6. A process according to claim 5 wherein said copper compound is selected from the group consisting of cuprous oxide, cupric oxide and basic copper carbonate, wherein said solvent is selected from the group consisting of pyridine, quinoline and acridine, wherein said polymerization inhibitor is pyrocatechol, and wherein said maleic acid half ester is decarboxalated at a temperature from 100° to 290°C.

7. A process for producing acrylic acid esters which consists of (a) forming a maleic acid half ester from a mixture consisting of maleic acid anhydride and at least one alcohol component selected from the group consisting of aliphatic, monohydric primary $C_1$ to $C_4$ alcohols, aliphatic, monohydric secondary $C_1$ to $C_4$ alcohols and mixtures thereof, the molar ratio ($x$) of said alcohol to said maleic acid anhydride component being defined by the equation $$x = {}^{98}/m - M$$

wherein $m$ is a number from 92 to 106, $M$ is the molecular weight of the alcohol forming the alcohol component when said alcohol component consists of a single alcohol, and $M$ is the arithmetical mean of the molecular weights of the alcohols forming the alcohol component when said alcohol component consists of a plurality of alcohols, (b) decarboxylating said maleic acid half ester to an acrylic acid ester by heating said maleic acid half ester at a temperature within the range of about 100°C. to about 290°C. in the presence of a mixture consisting of a copper compound selected from the group consisting of cuprous oxide, cupric oxide and basic copper carbonate, and an organic nitrogen compound selected from the group consisting of pyridine, quinoline and acridine, and (c) isolating said acrylic acid ester.

* * * * *